F. E. Sickels,
Steam-Engine Valve-Gear.
No. 1,263. Reissued Jan. 28, 1862.
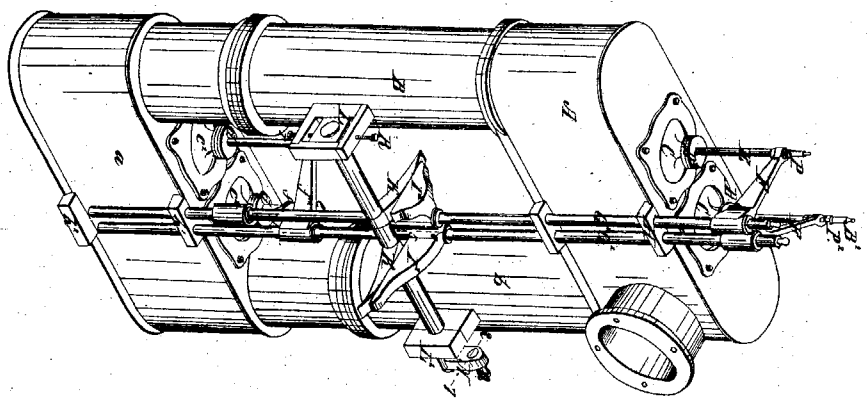
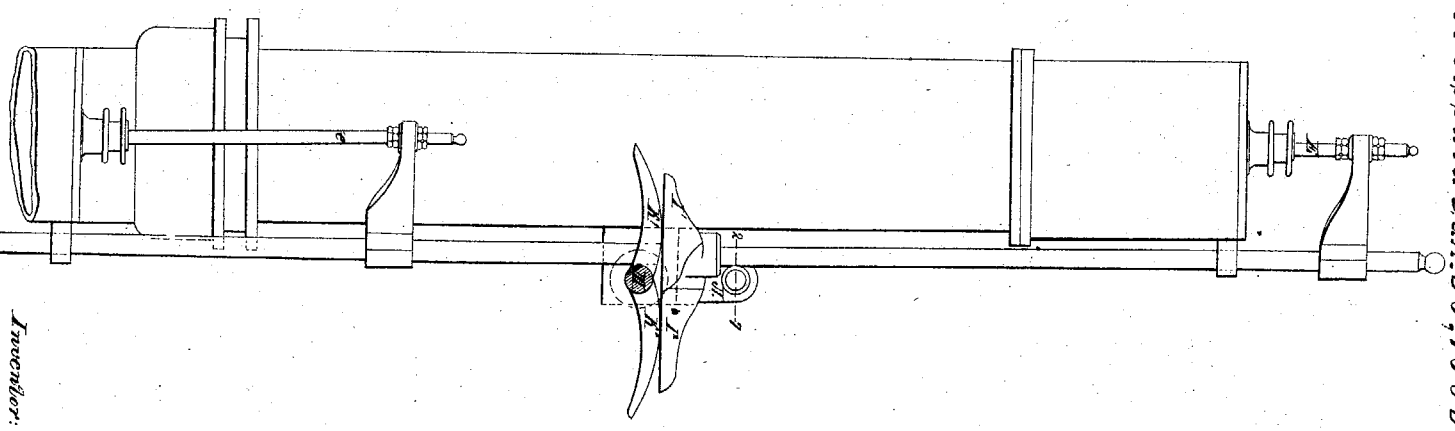
Witnesses:
F. E. Sickels
J. Mitchell Sayler
Inventor:
Frederick E. Sickels
AM. PHOTO-LITHO. CO. N.Y. (OSBORNE'S PROCESS.)

UNITED STATES PATENT OFFICE.

FREDERICK E. SICKELS, OF NEW YORK, N. Y.

IMPROVEMENT IN THE METHOD OF OPENING AND CLOSING THE VALVES OF STEAM-ENGINES.

Specification forming part of Letters Patent No. 3,802, dated October 19, 1844; Reissue No. 1,113, dated January 1, 1861; Reissue No. 1,263, dated January 28, 1862.

*To all whom it may concern:*

Be it known that I, FREDERICK ELSWORTH SICKELS, of the city of New York and State of New York, have invented a new and useful improvement in the motion of exhaust-valves for steam-engines, so that the steam will act with greater practical efficiency than it would without the improvement hereinafter practically described, it being of such a nature as to be easily and advantageously arranged for and applied to variously-arranged steam-engines.

In Sheet No. 1 my improvement is shown in connection with others patented to me the same day as this, and they will be described in part to facilitate the understanding of this improvement herein patented, notwithstanding it may be used without them, and they may be used without it, although the most perfect result is produced by using them in combination.

Sheet No. 1 is a drawing of the steam-chest, side pipes, and apparatus immediately connected with and used to work the steam and exhaust valves of steam-engines as generally arranged for low-pressure double-valve steam-engines, excepting such parts as are altered for the purpose of showing my improvements herein, and elsewhere patented.

In the accompanying drawings, A *a* is the steam-chest. B *b* are the side pipes. C′ $C^2$ *c′* $c^2$ are the bonnets on the steam-chest. D′ $D^2$ *d′* $d^2$ are the stuffing-boxes for valve-stems. E′ $E^2$ *e′* $e^2$ are the valve-stems. F′ $F^2$ *f′* $f^2$ are the lifters. G′ $G^2$ are the lifting-rods. H′ $H^2$ *h′* $h^2$ are the bearings for lifting-rods. I′ $I^2$ are the feet on lifting-rods. K′ $K^2$ are the toes on the rock-shaft. L′ $L^2$ are the bearings for rock-shaft. M is the rock-shaft. N is the rock-shaft arm. P′ $P^2$ are the upper valve nuts on the upper steam and exhaust valve-stems, the lower ones being similar, but not represented in the drawings. O is the rock-shaft pin, to which the eccentric rod is connected.

I will now describe the usual combination and arrangement, together with the usual mode of operating the heretofore-mentioned parts, in connection with the accompanying drawings, for the purpose of hereinafter more particularly showing the distinction between the usual mode and the mode of and improvement in arranging and combining them so as to produce new and useful results.

As the pin O moves in the direction of from 7 toward 2, the toe $K^2$ acts upon the foot $I^2$ and causes it to rise, thereby opening the upper steam and lower exhaust valves, the valve stem nuts being so placed on the valve-stems as to cause the valves to open at the same time, or nearly so, the lifters commence to move, and by the movements of the pin O, returning in the direction from 2 to 7 the foot $I^2$ lowers, causing the upper steam and lower exaust valves to close, this taking place while the engine is completing one-half its stroke, after which, continuing the motion of the pin O in the direction from 2 toward 7, the toes K′ $K^2$ being so placed upon the rock-shaft M, in connection with the feet I′ $I^2$, that the toe K′ comes in contact with the foot I′ and causes it to rise and the upper exhaust and lower steam valves to open, the valve-stem nuts being placed (as before described) on the other valve stems; and by the movement of the pin O in the direction from 7 toward 2, returning, the toe K′ acts upon the foot I′, allowing it to lower, and allows the upper exhaust and lower steam valves to close, this taking place while the engine is completing the other half-stroke, the pin O being moved by the agency of the eccentric of the engine. It will be seen, therefore, from the foregoing description of the usual mode of opening and closing the steam and exhaust valves of steam-engines that while one lifting-rod, with its feet, lifters, and valves attached, is in motion the other lifting-rod with its attachments remain stationary.

I will now describe the nature of the improvement patented to me January 1, 1861, by reissued Patent No. 7, in order that the entire scope of the inventions may be seen in this patent, so that the public may be the better informed as to their value, but at the same time I wish it understood that the thing patented in this patent is entirely independent of the improvements therein patented, and may be used without them, although it is best to use them together. The improvement in that patent, which is there shown as carried into effect in combination with the improvements herein patented, consists in so regulating the periods of the movements of the valves as to leave the piston free to complete each stroke, also to give any desirable lead to the exhaust-valves and allow the piston to be in equilibrio near the completion of its stroke, (it not being absolutely necessary, if desirable, to give a lead to the steam-valves as heretofore,) which is effected by opening the lower exhaust-valve before the end of the upward stroke of the piston, and before the upper exhaust-valve is closed, and opening the upper exhaust-valve before the end of the downward stroke of the piston, and before the lower exhaust-valve is closed, the steam-valve being opened without a lead, and after the exhaust-valve on the corresponding end of the cylinder has been closed.

The improvement patented in said Reissue No. 7 further consists in a peculiar arrangement of the toes on the rock-shaft, feet on the lifting-rods, and the connection of the lifters with the valve-stems to carry into effect the above-stated improvements. The toes K′ $K^2$ are so placed, as represented in the drawings, in connection with the feet I′ $I^2$, so that before the toe $K^2$ has ceased to act upon the foot $I^2$ the other toe, K′, commences the raising of its foot I′, and so that before the toe K′ has ceased to lower its foot I′, the other toe, $K^2$, has commenced to raise its foot $I^2$. As by the moving of the rock-shaft pin O in the direction from 7 toward 2, the foot I′ will commence to descend in the direction from 3 toward 4, and the foot $I^2$ to raise in the direction from 5 toward 6; then by a further motion of the pin O in the direction from 7 toward 2, after the toe K′ has allowed the foot I′ to complete its descent, the toe $K^2$ continues to raise the foot $I^2$; then by a motion of the pin O in the direction from 2 toward 7 in returning, after the toe $K^2$ has allowed the foot $I^2$ to lower some distance, and during the progress of the foot $I^2$ downward, the toe K′ commences to act and raise the foot I′, this taking place during one half of the revolution of the engine. By a further motion of the pin O in the direction from 2 toward 7 the toe K′ continues to raise the foot I′ after the toe $K^2$ has allowed the foot $I^2$ to complete its descent, then by the motion of the pin O in the direction from 7 toward 2 in returning the toe K′ allows the foot I′ to descend, and after the foot I′ has descended some distance and is yet on its downward motion, the toe $K^2$ comes in contact with and commences to raise the foot $I^2$, this taking place during the other half-revolution of the engine. The descent of one toe and one foot while the other is rising takes place at or near the center of the engine, the pin O being moved by the eccentric of the engine in the direction from 7 toward 2, as shown in the drawings, and also in the direction from 2 toward 7 in returning. The nuts attached to the stems of the steam-valves are so arranged as to be adjustable and allow a slip of the lifters operating thereon of an inch, more or less, and to be equal, or nearly so, to the rise of the toes above the upper surface of the rock-shaft.

Having thus far explained the improved combination and arragement of the relative position of the toes and the feet, and also the effect which such combination has upon the motion of the toes and feet, as patented in said Reissue No. 7, I will now explain the improved combination of the relative position of the toes and feet and their connection with the steam and exhaust valves, and the improved effect which the whole of the combination and arrangement has upon the operation of such valves and the more efficient working of steam-engines.

As the pin O moves in the direction from 7 toward 2, and while the toe $K^2$ acts upon the foot $I^2$, and raises it with the lower exhaust-valve, and while the toe K′ allows the foot I′ with the upper exhaust-valve to lower, the upper steam-valve remains unmoved in consequence of the position and arrangement of the valve-stem nut $P^2$ and the lifter $F^2$, as shown in the drawings, the under surface of the valve stem-nut $P^2$ being placed so far above the lifter, which acts upon it as the toe $I^2$ raises while the toe I′ is descending by continuing the motion of the pin O in the direction from 7 toward 2. When the foot I′ has finished its motion and the upper exhaust-valve closes, the upper steam-valve opens in consequence of the lifter $F^2$ being brought in contact with the valve-stem nut $P^2$; then by the motion of the pin O in the direction from 3 toward 7 in returning, and as the upper steam-valve closes the toe K′ comes in contact with the foot I′, raising it, at the same time opening the upper exhaust-valve, this taking place during half of the revolution of the engine, and by continuing the motion of the pin O in the direction from 2 toward 7, and as the toe $K^2$ allows the foot $I^2$ to lower and the lower exhaust-valve to close, the toe K′ continuing to raise, the foot I′ continues the rise of the upper exhaust-valve, causing the lower steam-valve to open as the lifter F′ acts upon the nut of the stem of the lower steam-valve in the same manner as the upper lifter, $F^2$, acts upon the nut $P^2$ on the stem of the upper steam-valve, as hereinbefore described, and by continuing the motion of the pin O in the direction from 2 toward 7 the toe K′ continues to raise the foot I′ with the upper exhaust and the lower steam valves; then in returning in the direction from 7 toward 2 it permits the upper exhaust and lower steam valves to lower, and as the lower steam-valve shuts the lower exhaust-valve opens in consequence of the action of the toe $K^2$ on the foot $I^2$ and the connection of these valves, as hereinbefore mentioned, this taking place during the other half-revolution of the engine.

L is a movable bearing supporting one end of the rock-shaft M, which is operated upon by the screws R *r*, so as to raise or lower the rock-shaft, so as to vary or suspend the operation of the improved combination and arrangement hereinbefore described.

I have herein first described the usual mode of opening and closing steam and exhaust valves of steam-engines and lastly described the improved combination and arrangement and its mode of action, when used for the purpose of opening one exhaust-valve before the other closes.

I have also in this specification described the improved combination and arrangement of the apparatus for the opening and closing steam and exhaust valves in steam-engines, as represented in the accompanying drawings, being aware that there are various ways by which the combination can be applied to suit the differently arranged engines now in use, all of which ways will involve the same mechanical principles. The movable bearing in the drawings for modifying or suspending the operation of the improved combination can be made to raise and lower by means of a lever attached to it so as to be readily worked by the engineer when desired. In engines having separate rock-shafts to open and close each valve a variation of the length of the connection between the respective rock-shafts, combined with the slip between the connections working the steam-valves, would constitute and be one method of carrying out the improved combination. Another mode is by placing pieces or cams upon the toes, or rock-shafts without toes, or by modifying the shape of the feet upon the lifting-rods by placing cams thereon or otherwise, so as to operate in connection with the other parts described in the drawings. In engines having one rock-shaft to work the steam-valves and another to work the exhaust-valves the improved combination would be produced by altering the position of the toes upon the rock-shaft working the exhaust-valves, so as to be similar to the toes and rock-shaft shown in the drawings, thereby causing the toes on the rock-shaft working the steam-valves to open them at the same time the steam-valves open with the combination and arrangement attached to the engine.

By means of the combination and improvement heretofore described and patented as aforesaid in the relative position of the toes on the rock-shaft with the nuts on the valve-stems of the steam-valves and their relative position to the valves as herein set forth, any desirable lead may be given to the exhaust-valves without the piston of the steam-cylinder being subjected to any opposing force or difficulty in consequence thereof, which effect cannot be produced by any device heretofore known or used. Besides, both exhaust-valves may together be open for a desirable moment of time, so that the piston of the steam-cylinder shall be in equilibrio when it shall nearly have completed its stroke, thereby being enabled to shut a portion of the steam being exhausted into the steam-chest nearest the piston, that it may be used in combination with steam emitted from the boiler to drive the piston the return stroke.

Having thus fully described the nature of the improvement patented as aforesaid in the combination of the toes attached to the rock-shaft, with the nuts attached to the stems of the steam-valves, and the relative rise of the toes above the upper surface of the rock-shaft starting at the connecting-point even with the upper surface, and the slip of the lifters upon the steam valve-stems, with the peculiar and relative operation of the valves for admitting to and exhausting steam from the cylinders of steam engines in a more efficient and practical manner than by any means heretofore known or used, causing various parts of the engine to perform with much greater facility, thereby increasing speed or saving steam or fuel, I will now particularly point out the improvement herein patented, which is particularly shown in Sheet No. 2, and by the use of which very high motion in opening the exhaust-valves without moving the exhaust-valve a long distance previously to its opening, as must be done in all other methods of working exhaust-valves known before my invention, in which both valves were moving at the same time.

It will be seen by reference to Sheet No. 2 that, starting from a central position of the rock-shaft M, in moving in the direction from 2 toward 7, the exhaust-valve worked by the exhaust-valve stem E′ will gradually diminish in velocity as the leverage of the rock-shaft by means of the toe $K^2$ diminishes in its acting distance from the center of the shaft, while at the same time the toe K′, increasing its leverage by increasing its acting distance from the center of the shaft, thereby imparts an increasing motion to the exhaust valve worked by the exhaust-valve stem *e′*, and after the engine has made one half of a revolution and the arm N has returned to the position shown in the drawings, then by the motion of the arm N in the direction from 7 toward 2, the exhaust-valve worked by the exhaust-valve stem *e* will be gradually receiving an increasing velocity, while at the same time the exhaust-valve worked by the exhaust-valve-stem E′ will be diminishing in velocity. The toe $K^2$ increasing its leverage as the toe K′ decreases its leverage, thus they increase and diminish the acting distances from the center of the rock-shaft as the rock-shaft moves from the position shown in the drawings, the rock-shaft returning to the position shown in the drawings during the other half of a revolution of the engine, the engine being at or near one of its centers while the rock-shaft is in the position shown in the drawings, and the exhaust-valve to receive the largest amount of motion being the one that is the farthest from the piston at that time, thereby giving a free escape of steam from that end of the cylinder without compelling the other exhaust-valve to move an equal distance with it, as has been the custom when both exhaust-valves were moved at the same time heretofore.

Having thus fully described the nature and character of my improvement, what I claim as new, and desire to secure by Letters Patent, is—

1. Giving to each exhaust-valve alternately, while the piston is at or near the end of the cylinder farthest from it, a large amount of motion as compared with the motion of the other exhaust-valve at that time, so as to more fully exhaust the cylinder with less extent and greater ease of motion to the valves than has been done heretofore, substantially as described.

2. Imparting these motions to the exhaust-valve by means of a rocker interposed between the first motion from the engine and the valves, so that it will increase and diminish its leverage relative to each valve, while moving them, and thereby impart my improved motion.

FREDERICK E. SICKELS.

Witnesses:

T. E. SICKELS,

J. WINTHROP TAYLOR.